United States Patent
Ramacher et al.

(10) Patent No.: US 8,983,934 B2
(45) Date of Patent: Mar. 17, 2015

(54) SQL TUNING BASE

(75) Inventors: Mark Ramacher, San Carlos, CA (US);
Sreenath Bodagala, Nashua, NH (US);
Benoit Dageville, Foster City, CA (US);
Alex Tsukerman, Foster City, CA (US);
Stephen J. Vivian, Londonderry, NH (US); Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 441 days.

(21) Appl. No.: 10/936,468

(22) Filed: Sep. 7, 2004

(65) Prior Publication Data
US 2005/0097091 A1   May 5, 2005

Related U.S. Application Data

(60) Provisional application No. 60/500,490, filed on Sep. 6, 2003.

(51) Int. Cl.
*G06F 7/00* (2006.01)
*G06F 17/30* (2006.01)

(52) U.S. Cl.
CPC .... *G06F 17/30474* (2013.01); *G06F 17/30306* (2013.01); *Y10S 707/99932* (2013.01); *Y10S 707/99934* (2013.01); *Y10S 707/99944* (2013.01)
USPC ............. 707/721; 707/999.002; 707/999.004; 707/999.103

(58) Field of Classification Search
USPC .................................. 707/1–10, 100 S, 200 S
See application file for complete search history.

(56) References Cited

U.S. PATENT DOCUMENTS

| | | |
|---|---|---|
| 5,140,685 A | 8/1992 | Sipple et al. |
| 5,260,697 A | 11/1993 | Barrett et al. |
| 5,398,183 A | 3/1995 | Elliott |
| 5,408,653 A | 4/1995 | Josten et al. |
| 5,481,712 A | 1/1996 | Silver et al. |
| 5,504,917 A | 4/1996 | Austin |
| 5,544,355 A | 8/1996 | Chaudhuri et al. |
| 5,577,240 A | 11/1996 | Demers et al. |
| 5,634,134 A | 5/1997 | Kumai et al. |
| 5,724,569 A | 3/1998 | Andres |
| 5,737,601 A | 4/1998 | Jain et al. |
| 5,761,660 A | 6/1998 | Josten et al. |
| 5,765,159 A | 6/1998 | Srinivasan |
| 5,781,912 A | 7/1998 | Demers et al. |
| 5,794,227 A | 8/1998 | Brown |

(Continued)

OTHER PUBLICATIONS

Aboulnaga, A. et al. "Self-tuning Histograms: Building Histograms Without Looking at Data", Proceedings of the 1999 ACM SIGMOD International Conference on Management of Data, SIGMOD'99, Philadelphia, PA, 1999, pp. 181-192.

(Continued)

*Primary Examiner* — Kimberly Wilson
(74) *Attorney, Agent, or Firm* — Vista IP Law Group, LLP

(57) ABSTRACT

A computer readable medium storing a database query language statement tuning base in a tuning base memory location is disclosed. The tuning base includes tuning information for one or more query language statements. The tuning information for each statement includes one or more tuning actions for the statement, and a signature to allow an optimizer to identify the one or more tuning actions for the statement.

27 Claims, 5 Drawing Sheets

(56) References Cited

U.S. PATENT DOCUMENTS

| | | | |
|---|---|---|---|
| 5,794,229 A | 8/1998 | French et al. | |
| 5,806,076 A | 9/1998 | Ngai et al. | |
| 5,860,069 A * | 1/1999 | Wright | 707/4 |
| 5,870,760 A | 2/1999 | Demers et al. | |
| 5,870,761 A | 2/1999 | Demers et al. | |
| 5,940,826 A | 8/1999 | Heideman et al. | |
| 5,963,933 A | 10/1999 | Cheng et al. | |
| 5,963,934 A | 10/1999 | Cochrane et al. | |
| 5,991,765 A | 11/1999 | Vethe | |
| 6,052,694 A | 4/2000 | Bromberg | |
| 6,122,640 A | 9/2000 | Pereira | |
| 6,195,653 B1 | 2/2001 | Bleizeffer et al. | |
| 6,212,514 B1 | 4/2001 | Eberhard et al. | |
| 6,275,818 B1 | 8/2001 | Subramanian et al. | |
| 6,321,218 B1 | 11/2001 | Guay et al. | |
| 6,330,552 B1 | 12/2001 | Farrar et al. | |
| 6,349,310 B1 | 2/2002 | Klein et al. | |
| 6,353,818 B1 | 3/2002 | Carino, Jr. | |
| 6,356,889 B1 | 3/2002 | Lohman et al. | |
| 6,366,901 B1 | 4/2002 | Ellis | |
| 6,366,903 B1 | 4/2002 | Agrawal et al. | |
| 6,374,257 B1 * | 4/2002 | Guay et al. | 707/103 R |
| 6,397,207 B1 | 5/2002 | Bleizeffer et al. | |
| 6,397,227 B1 | 5/2002 | Klein et al. | |
| 6,434,545 B1 | 8/2002 | MacLeod et al. | |
| 6,434,568 B1 | 8/2002 | Bowman-Amuah | |
| 6,442,748 B1 | 8/2002 | Bowman-Amuah | |
| 6,460,027 B1 | 10/2002 | Cochrane et al. | |
| 6,460,043 B1 | 10/2002 | Tabbara et al. | |
| 6,493,701 B2 | 12/2002 | Ponnekanti | |
| 6,496,850 B1 | 12/2002 | Bowman-Amuah | |
| 6,513,029 B1 | 1/2003 | Agrawal et al. | |
| 6,529,901 B1 | 3/2003 | Chaudhuri et al. | |
| 6,560,606 B1 | 5/2003 | Young | |
| 6,571,233 B2 | 5/2003 | Beavin et al. | |
| 6,594,653 B2 | 7/2003 | Colby et al. | |
| 6,598,038 B1 | 7/2003 | Guay et al. | |
| 6,615,223 B1 | 9/2003 | Shih et al. | |
| 6,701,345 B1 | 3/2004 | Carley et al. | |
| 6,714,943 B1 | 3/2004 | Ganesh et al. | |
| 6,721,724 B1 | 4/2004 | Galindo-Legaria et al. | |
| 6,728,719 B1 | 4/2004 | Ganesh et al. | |
| 6,728,720 B1 | 4/2004 | Lenzie | |
| 6,744,449 B2 | 6/2004 | MacLeod et al. | |
| 6,763,353 B2 | 7/2004 | Li et al. | |
| 6,804,672 B1 | 10/2004 | Klein et al. | |
| 6,816,874 B1 * | 11/2004 | Cotner et al. | 707/204 |
| 6,839,713 B1 | 1/2005 | Shi et al. | |
| 6,850,925 B2 | 2/2005 | Chaudhuri et al. | |
| 6,865,567 B1 | 3/2005 | Oommen et al. | |
| 6,910,109 B2 | 6/2005 | Holman et al. | |
| 6,912,547 B2 | 6/2005 | Chaudhuri et al. | |
| 6,915,290 B2 | 7/2005 | Bestgen et al. | |
| 6,931,389 B1 | 8/2005 | Bleizeffer et al. | |
| 6,934,701 B1 | 8/2005 | Hall, Jr. | |
| 6,947,927 B2 | 9/2005 | Chaudhuri et al. | |
| 6,961,931 B2 | 11/2005 | Fischer | |
| 6,999,958 B2 | 2/2006 | Carlson et al. | |
| 7,007,013 B2 | 2/2006 | Davis et al. | |
| 7,031,958 B2 | 4/2006 | Santosuosso | |
| 7,047,231 B2 | 5/2006 | Grasshoff et al. | |
| 7,058,622 B1 | 6/2006 | Tedesco | |
| 7,080,062 B1 | 7/2006 | Leung et al. | |
| 7,139,749 B2 | 11/2006 | Bossman et al. | |
| 7,146,363 B2 | 12/2006 | Waas et al. | |
| 7,155,426 B2 * | 12/2006 | Al-Azzawe | 707/3 |
| 7,155,459 B2 | 12/2006 | Chaudhuri et al. | |
| 7,174,328 B2 * | 2/2007 | Stanoi et al. | 707/713 |
| 7,272,589 B1 | 9/2007 | Guay et al. | |
| 7,302,422 B2 | 11/2007 | Bossman et al. | |
| 7,353,219 B2 | 4/2008 | Markl et al. | |
| 7,617,201 B1 * | 11/2009 | Bedell et al. | 1/1 |
| 2002/0073086 A1 | 6/2002 | Thompson et al. | |
| 2002/0120617 A1 | 8/2002 | Yoshiyama et al. | |
| 2002/0198867 A1 | 12/2002 | Lohman et al. | |
| 2003/0018618 A1 | 1/2003 | Bestgen et al. | |
| 2003/0065648 A1 | 4/2003 | Driesch et al. | |
| 2003/0088541 A1 | 5/2003 | Zilio et al. | |
| 2003/0093408 A1 | 5/2003 | Brown et al. | |
| 2003/0110153 A1 * | 6/2003 | Shee | 707/1 |
| 2003/0115183 A1 | 6/2003 | Abdo et al. | |
| 2003/0126143 A1 | 7/2003 | Roussopoulos et al. | |
| 2003/0130985 A1 | 7/2003 | Driesen et al. | |
| 2003/0135478 A1 | 7/2003 | Marshall et al. | |
| 2003/0154216 A1 | 8/2003 | Arnold et al. | |
| 2003/0177137 A1 | 9/2003 | MacLeod et al. | |
| 2003/0182276 A1 | 9/2003 | Bossman et al. | |
| 2003/0187831 A1 * | 10/2003 | Bestgen et al. | 707/3 |
| 2003/0200204 A1 | 10/2003 | Limoges et al. | |
| 2003/0200537 A1 | 10/2003 | Barsness et al. | |
| 2003/0229621 A1 | 12/2003 | Carlson et al. | |
| 2003/0229639 A1 | 12/2003 | Carlson et al. | |
| 2003/0236782 A1 * | 12/2003 | Wong et al. | 707/5 |
| 2004/0002957 A1 | 1/2004 | Chaudhuri et al. | |
| 2004/0003004 A1 | 1/2004 | Chaudhuri et al. | |
| 2004/0010488 A1 * | 1/2004 | Chaudhuri et al. | 707/3 |
| 2004/0019587 A1 * | 1/2004 | Fuh et al. | 707/2 |
| 2004/0034643 A1 | 2/2004 | Bonner et al. | |
| 2004/0181521 A1 | 9/2004 | Simmen et al. | |
| 2004/0210563 A1 | 10/2004 | Zait et al. | |
| 2004/0215626 A1 | 10/2004 | Colossi et al. | |
| 2005/0033734 A1 | 2/2005 | Chess et al. | |
| 2005/0097078 A1 | 5/2005 | Lohman et al. | |
| 2005/0097091 A1 | 5/2005 | Ramacher et al. | |
| 2005/0102305 A1 | 5/2005 | Chaudhuri et al. | |
| 2005/0119999 A1 | 6/2005 | Zait et al. | |
| 2005/0120000 A1 | 6/2005 | Ziauddin et al. | |
| 2005/0120001 A1 | 6/2005 | Yagoub et al. | |
| 2005/0125393 A1 | 6/2005 | Yagoub et al. | |
| 2005/0125398 A1 | 6/2005 | Das et al. | |
| 2005/0125427 A1 | 6/2005 | Dageville et al. | |
| 2005/0125452 A1 | 6/2005 | Ziauddin et al. | |
| 2005/0138015 A1 | 6/2005 | Dageville et al. | |
| 2005/0177557 A1 | 8/2005 | Ziauddin et al. | |
| 2005/0187917 A1 | 8/2005 | Lawande et al. | |
| 2005/0251523 A1 | 11/2005 | Rajamani et al. | |
| 2006/0004828 A1 | 1/2006 | Rajamani et al. | |
| 2006/0167883 A1 | 7/2006 | Boukobza | |
| 2007/0038618 A1 | 2/2007 | Kosciusko et al. | |

OTHER PUBLICATIONS

Almeida, et al., "Panasync: Dependency tracking among file copies", Proceedings of the 9th Workshop on ACM SIGOPS European Workshop: Beyond the PC: New Challenges for the Operating System, Kolding, Denmark, 2000, pp. 7-12.

Baldoni, et al., "A Communication-Induced Checkpointing Protocol that Ensures Rollback-Dependency Trackability", 27th Annual International Symposium on Fault-Tolerant Computing, FTCS-27, IEEE, 1997, pp. 68-77.

Baldoni, et al., "Rollback-Dependency Trackability: Visible Characterizations", Proceedings of the 18th Annual ACM Symposium on Principles of Distributed Computing, Atlanta, GA, 1999, pp. 33-42.

Damani, et al, "Optimistic Distributed Simulation Based on Transitive Dependency Tracking", Proceedings of the 11th Workshop on Parellel and Distributed Simulation, IEEE, 1997, pp. 90-97.

Elnozahy, "On the Relevance of Communication Costs of Rollback-Recovery Protocols", Proceedings of the 14th Annual ACM Symposium on Principles of Distributed Computing, Ottawa, Ontario, Canada, 1995, pp. 74-79.

Garcia, et al., "On the Minimal Characterization of the Rollback-Dependency Trackability Property", 21st International Conference on Distributed Computing Systems, IEEE, Apr. 16-19, 2001, pp. 342-349.

Graefe, G. "Dynamic Query Evaluation Plans: Some Course Corrections?", Bulletin of the IEEE Computer Society Technical Committee on Data Engineering, Jun. 2000, vol. 23, No. 2, pp. 3-6.

Hellerstein, J.M. et al. "Adaptive Query Processing: Technology in Evolution", Bulletin of the IEEE Computer Society Technical Committee on Data Engineering, Jun. 2000, vol. 23, No. 2, pp. 7-18.

Kabra, N. et al. "Efficient Mid-Query Re-Optimization of Sub-Optimal Query Execution Plans", Proceedings of the 1998 ACM

(56) References Cited

OTHER PUBLICATIONS

SIGMOD International Conference on Management of Data, SIGMOD'98, Seattle, WA, 1998, pp. 106-117.
Louboutin, et al., "Comprehensive Distributed Garbage Collection by Tracking Causal Dependencies of Relevant Mutator Events", Proceedings of the 17th International Conference on Distributed Computing Systems, IEEE, May 27-30, 1997, pp. 516-525.
Perry, "Consumer Electronics", IEEE Spectrum, Jan. 1997, vol. 34, No. 1, pp. 43-48.
Sadri, "Integrity Constraints in the Information Source Tracking Method", IEEE Transactions on Knowledge and Data, Feb. 1995, vol. 7, Issue 1, pp. 106-119.
Sreenivas, et al., "Independent Global Snapshots in Large Distributed Systems", Proceedings of the 4th International Conference on High Performance Computing, IEEE, Dec. 18-21, 1997, pp. 462-467.
Office Action dated Apr. 20, 2007 for U.S. Appl. No. 10/936,449.
Office Action dated Apr. 19, 2007 for U.S. Appl. No. 10/936,205.
Office Action dated Sep. 6, 2007 for U.S. Appl. No. 10/936,205.
Office Action dated Feb. 7, 2007 for U.S. Appl. No. 10/936,781.
Office Action dated Jul. 30, 2007 for U.S. Appl. No. 10/936,781.
Office Action dated Jan. 24, 2007 for U.S. Appl. No. 10/936,779.
Office Action dated Aug. 22, 2007 for U.S. Appl. No. 10/936,779.
Office Action dated Jan. 25, 2007 for U.S. Appl. No. 10/936,778.
Avnur, R. et al. "Eddies: Continuously Adaptive Query Processing" Proceedings of the 2000 ACM SIGMOD International Conference on Management of Data (SIGMOD '00), Dallas, TX, May 15-18, 2000, pp. 261-272.
Blakeley, J.A. et al. "Experiences Building the Open OODB Query Optimizer" Proceedings of the 1993 ACM SIGMOD International Conference on Management of Data (SIGMOD '93), Washington, DC, May 25-28, 1993, pp. 287-296.
Bruno, N. et al. "STHoles: A Multidimensional Workload-Aware Histogram" Proceedings of the 2001 ACM SIGMOD International Conference on Management of Data (SIGMOD '01), Santa Barbara, CA, May 21-24, 2001, pp. 211-222.
Bruno, N. et al. "Exploiting Statistics on Query Expressions for Optimization" Proceedings of the 2002 ACM SIGMOD International Conference on Data Management (SIGMOD '02), Madison, WI, Jun. 4-6, 2002, pp. 263-274.
Chaudhuri, S. "An Overview of Query Optimization in Relational Systems" Proceedings of the ACM SIGACT-SIGMOD-SIGART Symposium on Principles of Database Systems (PODS '98), Seattle, WA, Jun. 1-4, 1998, pp. 34-43.
Chaudhuri, S. et al. "Rethinking Database System Architecture: Towards a Self-Tuning RISC-style Database System" Proceedings of the 26th International Conference on Very Large Databases (VLDB 2000), Cairo, Egypt, Sep. 10-14, 2000, pp. 1-10.
Chen, C.M. et al. "Adaptive Selectivity Estimation Using Query Feedback" Proceedings of the 1994 ACM SIGMOD International Conference on Management of Data (SIGMOD '94), Minneapolis, MN, May 24-27, 1994, pp. 161-172.
Derr, M.A. "Adaptive Query Optimization in a Deductive Database System" Proceedings of the 2nd International Conference on Information and Knowledge Management (CIKM '93), Washington, DC, Nov. 1-5, 1993, pp. 206-215.
Ganek, A.G. et al. "The dawning of the autonomic computing era" IBM Systems Journal, 2003, vol. 42, No. 1, pp. 5-18.
Gassner, P. et al. "Query Optimization in the IBM DB2 Family" Data Engineering, Dec. 1993, vol. 16, No. 4, pp. 4-18.
Getoor, L. et al. "Selectivity Estimation using Probabilistic Models" Proceedings of the 2001 ACM SIGMOD International Conference on Management of Data (SIGMOD '01), Santa Barbara, CA, May 21-24, 2001, pp. 461-472.
Gorman, T. "The Search for Intelligent Life in the Cost-Based Optimizer" Jul. 2001, v1.0, pp. 1-11.
IBM "DB2 Universal Database Slashes Administration Costs by Reducing Time Spent on Administrative Tasks by up to 65 Percent" MarketWire, Sep. 9, 2004, pp. 1-3, located at http://www.marketwire.com/mw/release_html-b1?release_id=72387.
Ives, Z.G. et al. "An Adaptive Query Execution System for Data Integration" Proceedings of the 1999 ACM SIGMOD International Conference on Management of Data (SIGMOD '99), Philadelphia, PA, Jun. 1-3, 1999, pp. 299-310.
Lightstone, S.S. et al. "Toward Autonomic Computing with DB2 Universal Database" ACM SIGMOD Record, Sep. 2002, vol. 31, No. 3, pp. 55-61.
Markl, V. et al. "LEO: An autonomic query optimizer for DB2" IBM Systems Journal, 2003, vol. 42, No. 1, pp. 98-106.
Scheuermann, P. et al. "Adaptive Algorithms for Join Processing in Distributed Database Systems" Distributed and Parallel Databases, 1997, vol. 5, pp. 233-269.
Slivinskas, G. et al. "Adaptable Query Optimization and Evaluation in Temporal Middleware" Proceedings of the 2001 ACM SIGMOD International Conference on Management of Data (SIGMOD '01), Santa Barbara, CA, May 21-24, 2001, pp. 127-138.
Valentin, G. et al. "DB2 Advisor: An Optimizer Smart Enough to Recommend Its Own Indexes" Proceedings of the 16th International Conference on Data Engineering, Feb. 29-Mar. 3, 2000, pp. 101-110.
Zilio, D. et al. "Self-Managing Technology in IBM DB2 Universal Database8" Proceedings of the 10th International Conference on Information and Knowledge Management (CIKM '01), Atlanta, GA, Nov. 5-10, 2001, pp. 541-543.
Ioannidis et al, "Parametric Query Optimization", Proceedings of the 18 VLDB Conference, Vancouver, BC, Canada 1992, pp. 103-114.
Office Action dated Jan. 25, 2007 for U.S. Appl. No. 10/935,906.
Office Action dated Aug. 9, 2007 for U.S. Appl. No. 10/935,906.
Office Action dated Mar. 9, 2007 for U.S. Appl. No. 10/936,469.
Office Action dated Oct. 17, 2007 for U.S. Appl. No. 10/936,469.
Office Action dated May 1, 2007 for U.S. Appl. No. 10/936,426.
Office Action dated Sep. 6, 2007 for U.S. Appl. No. 10/936,426.
Office Action dated Nov. 25, 2008 for U.S. Appl. No. 10/935,906.
Office Action dated Apr. 9, 2008 for U.S. Appl. No. 10/935,906.
Office Action dated Oct. 31, 2008 for U.S. Appl. No. 10/936,779.
Office Action dated May 13, 2008 for U.S. Appl. No. 10/936,779.
Office Action dated Dec. 15, 2008 for U.S. Appl. No. 10/936,426.
Office Action dated Sep. 23, 2008 for U.S. Appl. No. 10/936,426.
Office Action dated Mar. 20, 2008 for U.S. Appl. No. 10/936,426.
Office Action dated Oct. 16, 2008 for U.S. Appl. No. 10/936,205.
Office Action dated Mar. 24, 2008 for U.S. Appl. No. 10/936,205.
Office Action dated Nov. 10, 2008 for U.S. Appl. No. 10/936,781.
Office Action dated Apr. 1, 2008 for U.S. Appl. No. 10/936,781.
Office Action dated Mar. 18, 2008 for U.S. Appl. No. 10/936,427.
Office Action dated Sep. 22, 2008 for U.S. Appl. No. 10/936,449.
Office Action dated Oct. 20, 2008 for U.S. Appl. No. 10/935,908.
Office Action dated Jul. 17, 2008 for U.S. Appl. No. 10/935,908.
Office Action dated Apr. 30, 2008 for U.S. Appl. No. 10/935,908.
Office Action dated May 2, 2007 for U.S. Appl. No. 10/935,908.
Office Action dated Dec. 11, 2008 for U.S. Appl. No. 10/936,469.
Office Action dated May 29, 2008 for U.S. Appl. No. 10/936,469.
Office Action dated Oct. 8, 2008 for U.S. Appl. No. 10/936,778.
Office Action dated Jul. 24, 2008 for U.S. Appl. No. 10/936,778.
Office Action dated Jan. 26, 2007 for U.S. Appl. No. 10/936,427.
Office Action dated Aug. 22, 2007 for U.S. Appl. No. 10/936,427.
Office Action dated Jan. 22, 2009 for U.S. Appl. No. 10/936,778.
Markl et al. "Learning Table Access Cardinalities with LEO" SIGMOD '02, Jun. 3-6, 2002, p. 613.
Stillger et al. "LEO—DB2's Learning Optimizer" VLDB 2001.
Office Action dated Sep. 6, 2007 for U.S. Appl. No. 10/936,449.
Office Action dated Mar. 28, 2008 for U.S. Appl. No. 10/936,449.
Office Action dated Mar. 4, 2009 for U.S. Appl. No. 10/936,449.
Office Action dated May 11, 2009 for U.S. Appl. No. 10/935,906.
Office Action dated May 12, 2009 for U.S. Appl. No. 10/936,779.
Office Action dated Mar. 31, 2009 for U.S. Appl. No. 10/936,427.
Office Action dated May 28, 2009 for U.S. Appl. No. 10/936,469.
Office Action dated Jul. 2, 2009 for U.S. Appl. No. 10/936,778.
Final Office Action dated Dec. 8, 2009 for U.S. Appl. No. 10/936,779.
Final Office Action dated Nov. 20, 2009 for U.S. Appl. No. 10/935,906.
Final Office Action dated Nov. 12, 2009 for U.S. Appl. No. 10/936,781.

(56) References Cited

OTHER PUBLICATIONS

Notice of Allowance dated Sep. 29, 2009 for U.S. Appl. No. 10/936,205.
Office Action dated Nov. 27, 2009 for U.S. Appl. No. 10/935,908.
Notice of Allowance dated Sep. 23, 2009 for U.S. Appl. No. 10/936,449.
Notice of Allowance dated Apr. 19, 2010 for U.S. Appl. No. 10/935,908.
Notice of Allowance dated Jan. 27, 2010 for U.S. Appl. No. 10/936,781.
Notice of Allowance dated Feb. 4, 2010 for U.S. Appl. No. 10/936,778.

* cited by examiner

SQL TUNING BASE

CROSS-REFERENCE TO RELATED APPLICATIONS

This application claims the benefit of U.S. Provisional Application No. 60/500,490, filed Sep. 6, 2003, which is incorporated herein by reference in its entirety. This application is related to co-pending applications "SQL TUNING SETS," with U.S. application Ser. No. 10/936,449; "AUTO-TUNING SQL STATEMENTS," with U.S. application Ser. No. 10/935,908; "SQL PROFILE," with U.S. application Ser. No. 10/936,205; "GLOBAL HINTS," with U.S. application Ser. No. 10/936,781; "HIGH LOAD SQL DRIVEN STATISTICS COLLECTION," with U.S. application Ser. No. 10/936,427; "AUTOMATIC LEARNING OPTIMIZER," with U.S. application Ser. No. 10/935,906; "AUTOMATIC PREVENTION OF RUN-AWAY QUERY EXECUTION," with U.S. application Ser. No. 10/936,779; "METHOD FOR INDEX TUNING OF A SQL STATEMENT, AND INDEX MERGING FOR A MULTI-STATEMENT SQL WORKLOAD, USING A COST-BASED RELATIONAL QUERY OPTIMIZER," with U.S. application Ser. No. 10/936,469; "SQL STRUCTURE ANALYZER," with U.S. application Ser. No. 10/936,426; "AUTOMATIC SQL TUNING ADVISOR," with U.S. application Ser. No. 10/936,778, all of which are filed Sep. 7, 2004 and are incorporated herein by reference in their entirety.

FIELD OF THE INVENTION

This invention is related to the field of electronic database management.

BACKGROUND

In a database management system, SQL statements are used to manipulate data and to retrieve data that matches certain selection criteria. A SQL statement is compiled in memory before being executed by a database engine. Though the compiled form of the SQL statement may be cached in memory for some amount of time for repeated executions, it is eventually discarded. Therefore SQL statements can be considered transient objects in a database system.

In practice, the set of SQL statements used by an application are repeatedly executed, and it is highly likely that the same SQL statements appear (are compiled into memory) with certain frequencies. The knowledge that certain SQL statements (especially those critical to application performance) reappear can be taken advantage of by placing special manual controls affecting the performance of the SQL statements.

However, selecting the proper control to insert is difficult or impossible, because execution data for the SQL statement is not collected and is therefore not used as feedback to select a control to influence future executions of a SQL statement. Even if an appropriate control is selected for targeting a SQL statement, the data (or metadata) cannot be associated with the SQL statement, because the SQL statement has no persistent representation. Thus, conventional methods place a control on a SQL statement by either modifying the text of the SQL statement, or by making modifications to the session context in which a SQL statement is executed. Both of these approaches require application changes, which can be difficult and sometimes impossible. Therefore, conventional methods of associating metadata with a SQL statement locate the metadata within the context of the executing SQL statement. If the metadata cannot be located in the execution context of SQL statement, the database system has no other way to deliver the metadata to the database engine when the SQL statement re-appears and is compiled into memory.

SUMMARY

A computer readable medium storing a database query language statement tuning base in a tuning base memory location is disclosed. The query language statement tuning base includes tuning information for one or more query language statements. The tuning information for each statement includes one or more tuning actions for the query language statement, and a signature to allow an optimizer to identify the one or more tuning actions for the query language statement.

DETAILED DESCRIPTION

Overview

The embodiments of the invention are described using the term "SQL", however, the invention is not limited to just this exact database query language, and indeed may be used in conjunction with other database query languages and constructs.

The SQL tuning base (STB) provides a storage facility for a SQL statement and tuning information associated with the statement. The STB provides a mechanism for providing access to tuning information by automatically collecting, analyzing, and delivering the tuning information to an optimizer. This persistence and delivery mechanism can store a variety of tuning features in a location that is external to the SQL statement. The tuning features can persistently target a specific SQL statement, and can be delivered by the STB to the optimizer when the SQL statement is compiled.

Figure 1:
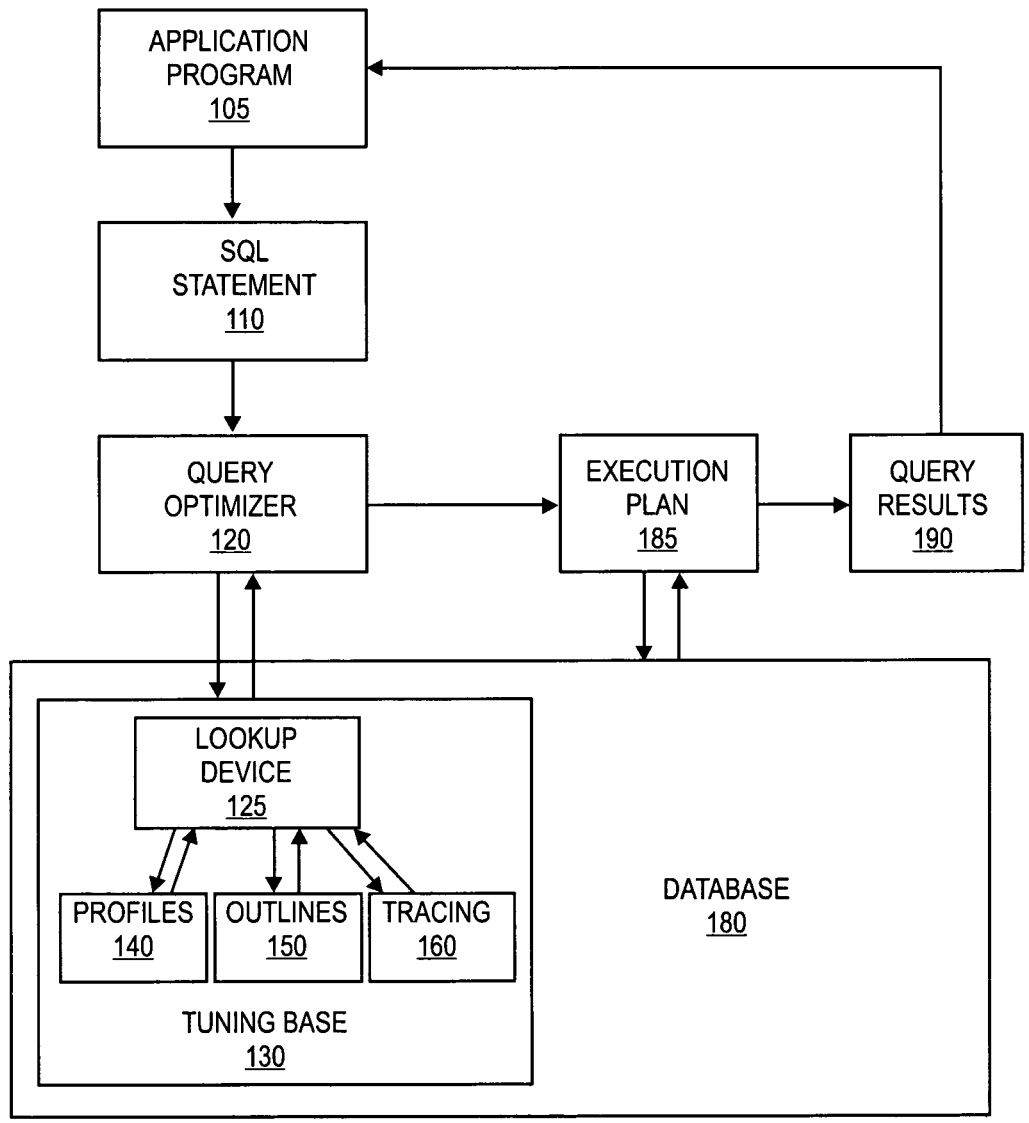
FIG. 1 shows an example of a device that includes a SQL tuning base.

An example of a device that includes a SQL tuning base is shown in FIG. 1. An application program 105 running on a computer processing system issues a SQL statement 110 to query optimizer 120. The optimizer sends a signature of the statement to lookup device 125 to determine if the tuning base 130 of database 180 has tuning information about the statement. The lookup device retrieves the information from a profile section 140, an outline section 150, or a tracing information section, 160, of tuning base 130. The optimizer uses the tuning information to generate an execution plan 185, which, when executed, selects query results 190 from the database 180, and returns the results to the application.

For example, a persistent representation of a SQL statement can be used by a lookup scheme to identify the tuning information for the SQL statement from the STB, and send it to the optimizer at SQL compilation time. The STB therefore allows a tuning control, such as historical feedback control for example, to target a specific SQL statement, while being stored outside of the SQL statement and the application program that stores the SQL statement. This ability to store tuning information independently of the SQL statement and the application program of the statement can be used to automatically manage the database.

The STB stores tuning information for SQL statements on a per statement basis. The STB stores multiple types of metadata objects related to tuning actions for individual SQL statements: tracing information, outlines, and profiles. The tracing information provides the ability to trace and debug individual SQL statements. The outline facility offers plan stability and plan editing capabilities. The profile facility provides plan tuning functions. The metadata in the STB can be represented as a set of dictionary tables. For example, the STB can include a SQL table that stores a set of SQL statements that are associated with one or more tuning actions. The STB can also include a profile table that stores SQL profiles, an outline table that stores outlines, and a tracing table that stores tracing information.

Access to Tuning Information

At SQL compilation time, a signature is generated from the SQL text, and is used as a lookup key for any SQL tuning data associated with this SQL statement. This signature can be extended to include other environmental data values known before SQL compilation, such as "parsing user name" for example.

Any STB data retrieved by the optimizer is either directly consumed by the optimizer in creating the execution plan, or is copied to the compiled SQL statement for use while the statement is executed. For example, in one embodiment, SQL profile data is copied into the compiled SQL statements. However, the SQL profiles and outlines can be used without copying their data. (The tracing and debugging data is copied though, since tracing and debugging are acted upon during SQL execution as well as during compilation.)

Because the SQL tuning base is expected to be sparsely populated (in other words, most SQL statements are usually not represented in the STB), the lookup mechanism can be designed to take advantage of the negative lookup case. In one embodiment, this is performed by hashing the signature into a bit-vector (cached in memory), where 0 represents the fact that no data exists for the given SQL statements that hash to this value, and 1 means that a lookup to the STB tables is performed to see if any data exists for it.

Figure 2:
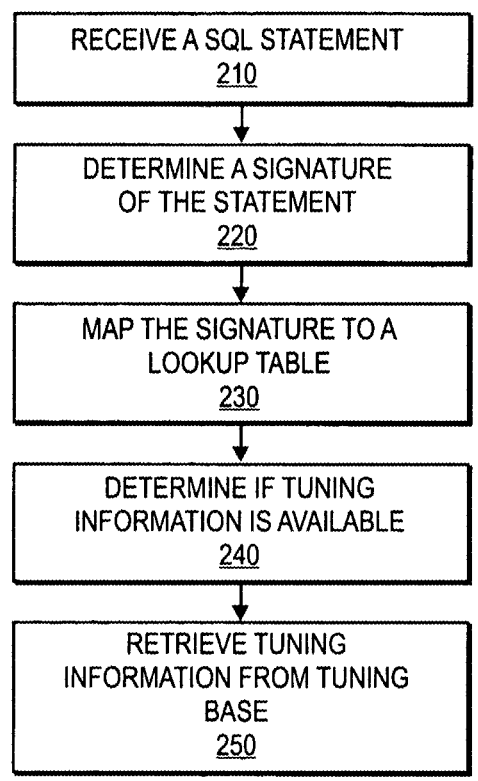
FIG. 2 shows an example of a method to perform accessing an object in a SQL tuning base.

FIG. 2 shows an example of a method to perform accessing an object in a SQL tuning base. The statement is received by a compiler, 210. The signature of the statement is determined, 220, and is mapped to a portion of a lookup table, 230. If the information in the mapped portion of the lookup table indicates that tuning information is available, 240, then the tuning information for the SQL statement is retrieved from the tuning base, 250. The tuning information is then used by the compiler to tune the statement.

Tracing and Debugging

Tracing and debugging information from the tracing table can be used to identify a flaw in a SQL statement. For example, if a database administrator (DBA) determines that a certain statement is a high load statement, the DBA can cause the system to trace the execution of the statement. The tracing output for the statement can be persistently stored and used during a tuning process. The tracing information can be collected for a single SQL statement to be traced by setting a tracing parameter using the STB. Other parameters, such as enabling plan statistics and setting plan events, can also be set using the STB. An advantage of setting these features through the tuning base is being able to perform tracing functions without changing the software for the SQL statement in the application program or enabling tracing for the entire user session.

In one implementation, tracing of a SQL statement in the database causes every execution of that statement to be traced until the tracing is disabled for the SQL statement. Similarly, the plan statistics are traced as well. And thus statistics can be collected and used to improve performance of the SQL statement across different sessions and time periods.

Figure 3:
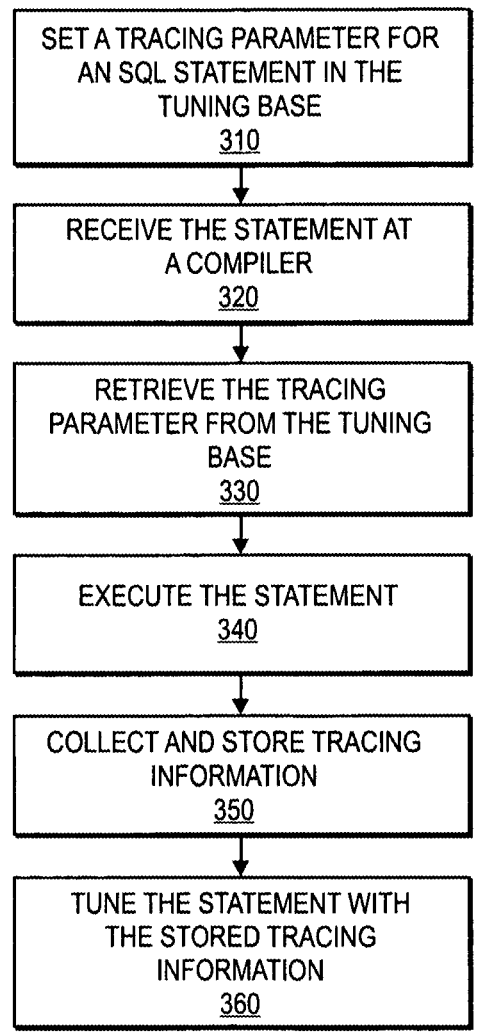
FIG. 3 shows an example of a method of generating and persistently storing tracing information with the tuning base.

A method of generating and persistently storing tracing information with the tuning base is shown in FIG. 3. A user sets a tracing parameter for the statement in the tuning base, 310. When the statement is received by a compiler, 320, the tracing parameter is retrieved from the tuning base, 330. When the statement is executed, 340, tracing information is collected and stored to disk, 350. The tracing information can then be used during a tuning process to tune the SQL statement, 360.

Outline

An outline is an abstraction of an execution plan generated by the optimizer. The stored outline, when used by an optimizer, causes the optimizer to use a specific plan, and, when stored in the tuning base, provides a persistent representation of the specific plan for the SQL statement. The outline can also be used to revert to a saved execution plan when a new plan generated by the optimizer is sub-optimal. Thus, an outline provides stability for an execution plan.

Profile

A SQL profile is a mechanism that is used to influence which plan is generated by the optimizer. The profile contains tuning information related to the statement, which is stored as a persistent database object, in a dictionary table, of the tuning base. A profile can have a name, and can be identified by its name, or by the signature of the corresponding SQL statement. The profile can be manually created by a database administrator (DBA), or automatically created by an auto-tune process. The profile can also be altered, cloned, deleted, and updated.

When the corresponding SQL statement is compiled (i.e., optimized), the query optimizer retrieves the SQL Profile from the tuning base. The tuning information from the SQL Profile is used by the optimizer, in conjunction with existing statistics, to produce a well-tuned plan for the corresponding SQL statement. The tuning information stored in the profile table can include a set of optimizer hints that target a particular SQL statement. Each hint can specify tuning actions such as setting parameters of the optimizer, adding or correcting statistics and estimates for the SQL statement, and modifying the execution behavior of the statement.

Statistics adjustment hints (e.g. TABLE_STATS( ), COLUMN_STATS( ), INDEX_STATS( ) hints) are used to adjust statistics of base objects accessed by the statement being compiled. For example, a NDV adjustment hint is used to correct the distinct cardinality, or the number of distinct values, estimate of a join key. A selectivity adjustment hint is used to correct the index selectivity of an index access path. A statistic adjustment hint contains adjustments to a stale statistic. A cardinality adjustment hint is used to correct the cardinality estimate of a result. An auto tuning hint can also specify correct optimization mode to use, such as FIRST_ROWS or ALL_ROWS.

The use of profile remains completely transparent to the end-user. For example, when a SQL statement is compiled, the optimizer searches the tuning base to determine if a SQL profile exists for that statement. If a profile exists, it is loaded into the optimizer, and information in the profile is used when building the execution plan for the statement. Because the profile is stored in the tuning base instead of being directly embedded in the text of the statement, the tuning base allows the hints in the profile to be fully separated from the statement.

An advantage of independently creating, storing, and accessing the profile with the SQL tuning base is that the SQL text is separated from the set of tuning hints and actions. Hence, the execution plan of a SQL statement can be tuned by the optimizer without changing the application source code of the statement. Therefore, with the tuning information stored in the tuning base, execution plans for SQL statements that are issued by packaged applications are tuned by gathering and storing related information for the SQL statement within the SQL tuning base of the database system itself.

Figure 4:
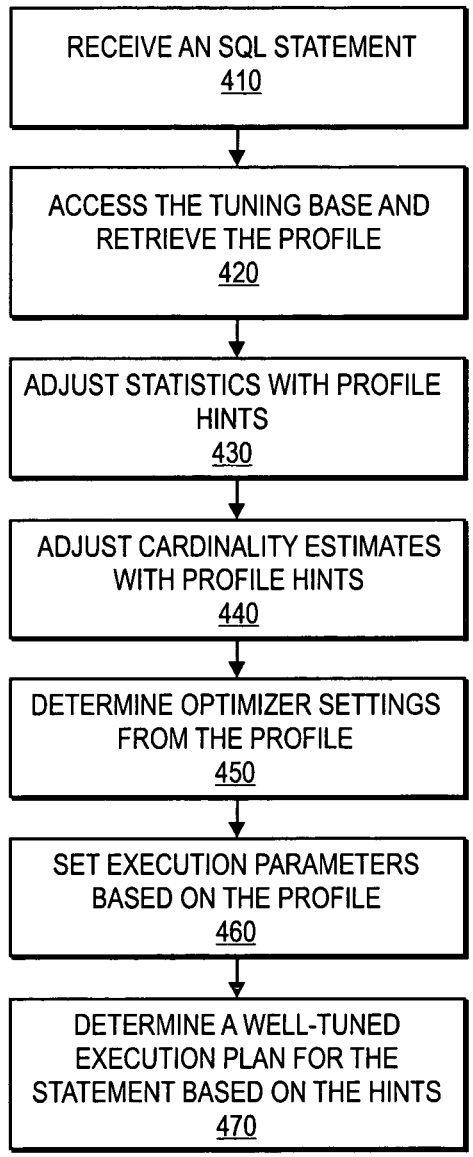
FIG. 4 shows an example of a method to use a profile in the tuning base to generate a well-tuned plan.

FIG. 4 shows an example of a method to use a profile in the tuning base to generate a well-tuned plan. The statement is received by a compiler, 410. The profile for the statement is retrieved from the tuning base, 420. Statistic hints in the profile are used to adjust statistics related to the statement, 430. Estimate hints in the profile are used to adjust table estimates, 440. Optimizer settings are determined from tuning information in the profile, 450. Execution parameters for the statement are set based on the information in the profile, 460. A well-tuned execution plan for the statement is determined based on the hints, 470.

Automatic Creation of Tuning Information

The tuning information for a SQL statement can be automatically generated by the database system. For example, an auto tuning optimizer, when tuning a statement, can detect errors present in estimates related to the statement. After an error is detected, it can be removed or reduced by applying a hint, such as an adjustment factor, to it. By reducing or eliminating these errors, the optimizer can select a better execution plan. Hints can also be generated to adjust stale statistics or to supply missing statistics for tables and indexes. Further, hints can be generated to store and supply relevant information about the past execution history of the SQL statement. The execution history can then be sent from the STB to the optimizer, to set an appropriate optimization mode.

The auto-tuning hints for the SQL statement are grouped together in a SQL profile which is associated with the SQL statement and is stored persistently in the SQL tuning base. When the SQL statement is compiled by the optimizer under normal mode, the auto tuning hints from the corresponding SQL profile are retrieved from the SQL tuning base to help the optimizer produce a well-tuned plan. Hence, the tuning process can be performed only once, and the resulting hints can be reused many times.

Figure 5:
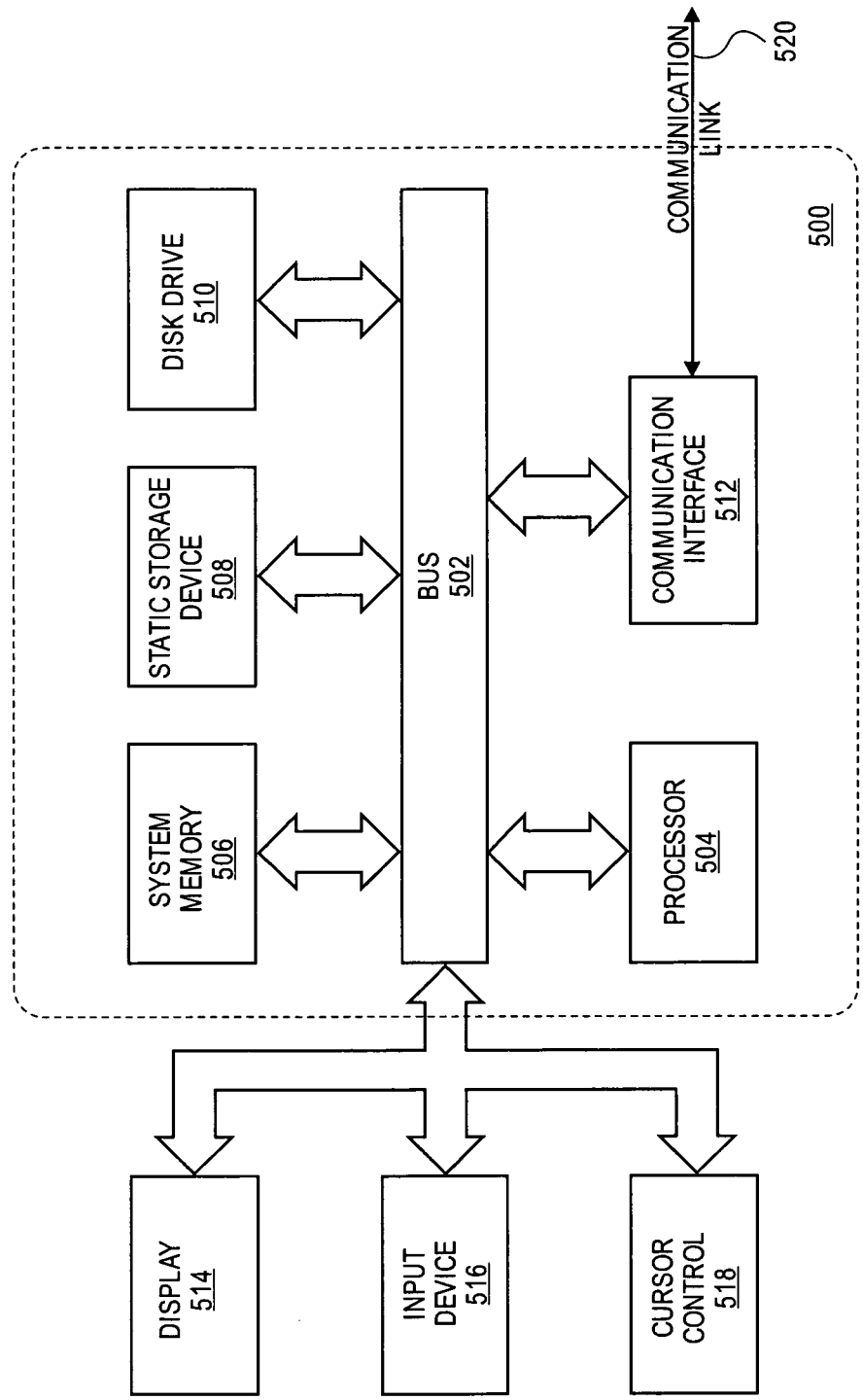
FIG. 5 is a block diagram of a computer system suitable for implementing an embodiment of coverage computation for verification.

FIG. 5 is a block diagram of a computer system 500 suitable for implementing an embodiment of verification based on coverage computation. Computer system 500 includes a bus 502 or other communication mechanism for communicating information, which interconnects subsystems and devices, such as processor 504, system memory 506 (e.g., RAM), static storage device 508 (e.g., ROM), disk drive 510 (e.g., magnetic or optical), communication interface 512 (e.g., modem or ethernet card), display 514 (e.g., CRT or LCD), input device 516 (e.g., keyboard), and cursor control 518 (e.g., mouse or trackball).

According to one embodiment of the invention, computer system 500 performs specific operations by processor 504 executing one or more sequences of one or more instructions contained in system memory 506. Such instructions may be read into system memory 506 from another computer readable medium, such as static storage device 508 or disk drive 510. In alternative embodiments, hard-wired circuitry may be used in place of or in combination with software instructions to implement the invention.

The term "computer readable medium" as used herein refers to any medium that participates in providing instructions to processor 504 for execution. Such a medium may take many forms, including but not limited to, non-volatile media and volatile media. Non-volatile media includes, for example, optical or magnetic disks, such as disk drive 510. Volatile media includes dynamic memory, such as system memory 506.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 500. According to other embodiments of the invention, two or more computer systems 500 coupled by communication link 520 (e.g., LAN, PTSN, or wireless network) may perform the sequence of instructions to practice the invention in coordination with one another. Computer system 500 may transmit and receive messages, data, and instructions, including program, i.e., application code, through communication link 520 and communication interface 512. Received program code may be executed by processor 504 as it is received, and/or stored in disk drive 510, or other non-volatile storage for later execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

We claim:

1. An article of manufacture comprising a volatile or non-volatile computer readable storage medium storing a system for tuning database query language statements, comprising:
   a tuning base containing tuning information for a database query language statement, the tuning information comprising:
      trace information for the database query language statement, wherein
         the trace information comprises statistics of a database object for the database query language statement, wherein the statistics in the trace information are adjusted to tune execution of the database query language statement when the database query language statement is compiled or executed; and
      a signature which is generated during compilation of the database query language statement and is used to identify the trace information for the database query language statement; and
   a query optimizer that tunes the database query language statement at least by retrieving at least the tuning information from the tuning base during compilation of the database query language statement, based at least in part the signature for the database query language statement, wherein
      the query optimizer tunes the database query language statement at least by modifying a compiled database query statement of the database query language statement to include at least a part of the tuning information for the execution of the compiled database query statement with an execution plan, and the query optimizer adjusts the statistics in the trace information to tune the database query language statement, by using one or more statistics adjustment hints.

2. The article of claim 1, the tuning information further comprising:

tracing information collected during one or more previous executions of the statement.

3. The article of claim 1, the tuning information further comprising:

an outline to persistently represent a stored execution plan of the statement.

4. The article of claim 1, the tuning information further comprising:

a profile to persistently represent tuning hints to influence a generation of the execution plan of the statement.

5. The article of claim 1, the computer readable storage medium further comprising:

one or more SQL statements stored in a second memory location that is independent of a memory location storing the tuning base.

6. The article of claim 1, wherein the signature for the statement is based on a normalized text of the statement.

7. The article of claim 1, wherein the database query language statement is a SQL statement.

8. A computer implemented method for retrieving tuning information for a database query language statement, the method comprising:

receiving a signature, the signature being generated based on a database query language statement during compilation of the database query language statement, wherein the signature allows an optimizer at a database server to identify trace information for the database query language statement for retrieving the tuning information during the compilation of the database query language statement, and the trace information comprises statistics of a database object for the database query language statement;

determining, by using a processor, whether trace information for the database query language statement is available based at least in part upon the signature;

tuning the database query language statement at least by retrieving the tuning information based at least in part upon the signature for the database query language statement from a tuning base, and further by modifying a compiled database query statement of the database query language statement to include at least a part of the tuning information for execution of the compiled database query statement with an execution plan; and adjusting the statistics in the trace information, which is used to further tune the database query language statement, by using one or more statistics adjustment hints.

9. The method of claim 8, the tuning information further comprising:

tracing information collected during one or more previous executions of the statement.

10. The method of claim 8, the tuning information further comprising:

an outline to persistently represent a stored execution plan of the statement.

11. The method of claim 8, the tuning information further comprising:

a profile to persistently represent tuning hints to influence a generation of the execution plan of the statement.

12. The method of claim 8, wherein one or more SQL statements are stored in a memory location that is independent of a memory location storing the tuning base.

13. The method of claim 8, wherein the signature for the statement is based on a normalized text of the statement.

14. The method of claim 8, wherein the statement is an SQL statement.

15. The method of claim 8, wherein determining whether trace information for the database query language statement is available comprises:

mapping the signature to a lookup table.

16. The computer implemented method of claim 8, wherein the act of determining whether the trace information is available is performed by using at least a negative identification case.

17. The computer implemented method of claim 8, wherein at least a part of the tuning information is copied into the database query language statement.

18. The computer implemented method of claim 8, wherein the tuning information comprises a profile which provides one or more tuning functions for tuning the database query statement.

19. The computer implemented method of claim 8, wherein the tuning information comprises an outline which provides execution plan editing capability.

20. A system for retrieving tuning information for a database query language statement, the system comprising:

a hardware processor for performing:

receiving a signature, the signature being generated based on a database query language statement during compilation of the database query language statement, wherein the signature allows an optimizer at a database server to identify trace information for the database query language statement for retrieving the tuning information during the compilation of the database query language statement, and the trace information comprises statistics of a database object for the database query language statement;

determining, by using a processor, whether trace information for the database query language statement is available based at least in part upon the signature;

tuning the database query language statement at least by retrieving the tuning information based at least in part upon the signature for the database query language statement from a tuning base, and further by modifying a compiled database query statement of the database query language statement to include at least a part of the tuning information for execution of the compiled database query statement with an execution plan; and adjusting the statistics in the trace information, which is used to further tune the database query language statement, by using one or more statistics adjustment hints.

21. The system of claim 20, the tuning information further comprising:

tracing information collected during one or more previous executions of the statement.

22. The system of claim 20, the tuning information further comprising:

an outline to persistently represent a stored execution plan of the statement.

23. The system of claim 20, the tuning information further comprising:

a profile to persistently represent tuning hints to influence a generation of the execution plan of the statement.

24. The system of claim 20, wherein one or more SQL statements are stored in a memory location that is independent of a memory location of the tuning base.

25. The system of claim 20, wherein the signature for the statement is based on a normalized text of the statement.

26. The system of claim 20, wherein the statement is an SQL statement.

27. The system of claim 20, wherein the tuning information further comprising:
   means for mapping the signature to a lookup table.

* * * * *